INVENTORS
RICHARD BRUCE JOHNSON
GEORGE WINN
BY Jacobi & Davidson
ATTORNEYS

United States Patent Office

3,830,898
Patented Aug. 20, 1974

3,830,898
METHOD FOR MAKING SUBSTANTIALLY SEAMLESS FOAMED ARTICLES
Richard Bruce Johnson, Centerear, N.Y., and George Winn, Livingston, N.J., assignors to Jacob J. Rosen, New York, N.Y.
Filed Mar. 11, 1969, Ser. No. 806,180
Int. Cl. B29d 27/00
U.S. Cl. 264—45
11 Claims

ABSTRACT OF THE DISCLOSURE

Methods and means for producing foamed articles such as doll bodies which are substantially seamless. A limited internal discontinuity is defined during the foaming operation, and stripping of the article through a limited opening in a seamless mold part is accomplished by urging portions of the foamed article into the internal discontinuity. Pressurized gas is introduced between the article-forming surfaces of the mold cavity and the foamed article to facilitate the stripping operation.

---

This application relates to methods for the production of foamed articles, and relates more particularly to the production of foamed articles which have no undesirable seam and thus from a practical standpoint, may be considered "seamless."

In order to be able to better understand the background of the instant invention, reference is made to copending application Ser. No. 679,476 filed Oct. 31, 1967, in the name of Jacob J. Rosen, and entitled "Process of Making Foamed Articles and Articles Produced Thereby," now Pat. No. 3,432,581 dated Mar. 11, 1969, the disclosure of which is incorporated herein in its entirety by reference. The subject Rosen patent contains a detailed description of techniques and apparatus utilized in the production of foamed articles, which techniques and apparatus may also be used in part for the production of foamed articles according to this invention. Although the Rosen patent relates to foamed articles generally, the exemplary embodiments discussed in detail therein are primarily directed to the production of doll bodies. Similarly, the present invention relates to the production of foamed articles generally, but since the invention will be readily understood by reference to the production of doll bodies and since the use of the inventive concepts is of particular commercial importance in this area, doll body manufacture will be utilized herein for illustrative purposes in discussing the instant invention and the problems solved thereby.

Although reference may be had to the aforementioned Rosen patent for the details of the methods and means disclosed therein, a brief summary of the general concepts will be helpful in understanding the instant invention. While not specifically limited thereto, the Rosen application contemplates the use of a multi-part mold, preferably a two-part mold, wherein a foamable plastic composition, preferably a foamable polyvinyl chloride plastisol, is initially introduced into one of the mold sections. The sections are then joined and the mold is moved and heated so that the foamable plastic composition is distributed throughout the entire mold and a layer of the same is gelled on the article-forming surfaces of the mold cavity. Thereafter, this layer of gelled plastisol is cured and foamed with the cavity of the mold being "vented" through relatively small passageway means during the curing and foaming operation. This venting communicates the interior of the mold with an environment under pressure less than that present within the mold during the foaming operation, such environment being either the atmosphere in an ordinary heated air oven or, preferably, a liquid heating medium in which the mold is submerged during the curing and foaming operation. As the material foams it fills the entire mold cavity with the internal pressure being released through the vents so as to prevent malformation. The resultant article is a "continuous" foamed body having a smooth, integrally formed "skin," with desirable feel characteristics and a cellular and resilient interior construction, in contrast to a "hollow" product. The integrally formed "skin" described in the aforementioned Rosen patent is actually a continuation of the cellular interior which is substantially more dense so as to provide the resultant article with a fine, smooth surface capable of high definition of detail.

For a further understanding of some of the problems with which the instant invention is concerned, reference is also made to copending Rosen application Ser. No. 664,700 filed Aug. 31, 1967, and entitled "Method and Apparatus for Making Foamed Articles Without Undesirably Located Seams," now Pat. No. 3,456,046 dated July 15, 1969, the disclosure of which is incorporated herein in its entirety by reference. In Pat. No. 3,456,046, techniques are described for production of a foamed article again, preferably, a doll body utilizing the basic procedure described hereinabove with reference to Rosen Pat. No. 3,432,581, with the products resulting from the modifications disclosed in Rosen Pat. No. 3,456,046 being "effectively seamless." By "effectively seamless," Pat. No. 3,456,046 contemplates the production of foamed articles wherein the seams that result are located on the final product in a manner which is not commercially undesirable. Thus, in the production of a doll body having appendages such as arms and legs, the seams are positioned in spaced relationship to the arms and legs, with the arms and legs being free of seams so as to provide a more attractive finished product.

While the techniques of Pat. No. 3,456,046 do provide a significant improvement over foamed articles formed in multi-part molds wherein the seams are noticeable in ordinary use of the final product, it should be recognized that it would be advantageous to be able to produce articles such as doll bodies wherein the entire body portion, not only the arms and legs, would be free of seams. However, since the final product is continuous in nature, that is, formed of "solid" foam throughout and not collapsible as with a resilient "hollow" article, it has been impossible with techniques utilized heretofore to completely eliminate seams on all final exposed portions of a doll since the use of a multi-part mold which produces seams at some location where the product is of relatively large dimension is necessary in order that the product can be removed from the mold after foaming is completed. With a basically "hollow" product, such as a conventional rotationally cast non-foamed vinyl plastisol doll body, the resultant product can be readily removed from a substantially seamless mold through a limited opening at the neck by collapsing the hollow article and withdrawing the same through the neck opening. Yet, with a substantially "solid" product, as produced according to the Rosen techniques, the doll body cannot be collapsed sufficiently to permit stripping through a limited opening such as would be present at the neck.

The presence of seams on a final exposed portion of a product has several disadvantages. First of all, from an aesthetic standpoint, such a product is obviously less attractive than a product on which all final exposed portions are free of seams. Additionally, in using a multi-part mold, the seams are produced by "flash" which occurs as a result of plastic composition extruding through the joint formed between the mold parts. Products of this nature are ordinarily formed in metal molds, and the costs involved in making perfectly matching molds is such that eliminating "flash" is impractical. Moreover, even if perfectly matching molds were possible, use of such molds on a repetitive production basis would result in imperfections whereby flash would be formed. Thus, one must face the practical problem which arises with respect to undesirable flash even beyond the appearance of the seams on the final product.

Numerous techniques have been suggested heretofore for eliminating or minimizing flash, but none have been sufficiently practical to have found great favor in the industry to date. Therefore, significant time and money is required in removing the flash from the final product by an ordinary trimming operation prior to sale. These techniques increase the costs of production and, of course, cannot completely eliminate the presence of seams on the resultant article thereby diminishing the commercial desirability thereof due to the less attractive appearance.

The techniques of Rosen Pat. No. 3,456,046 do minimize both of the aforementioned problems by locating the flash and the seams resulting therefrom in an area on the final product which is generally not noticeable in use. Yet, these techniques do not eliminate the problems in that finally exposed seams are still present and flash must still be removed, albeit not quite so carefully.

The basic object of the instant invention is to provide methods for the production of foamed articles which are, in fact, seamless throughout with the exception of a limited area, such as at the extremity of the neck in a doll body, thereby having an appearance equivalent to that of a hollow article, while providing the advantages of the "solid" cellular interior. Specifically, this invention permits the production of a continuous foamed article in a two-part mold, wherein one part can define almost all of the external surfaces of the final article so that the same are free of seams, and wherein such one mold part provides a limited opening communicating with the interior thereof for introduction of a quantity of the unfoamed plastic composition and for removal of the foamed article.

Basic difficulties have been encountered in production of effectively seamless articles due to the inability with prior art techniques to remove the foamed article through a relatively small opening such as would occur at the neck of a doll body. The instant inventive concepts overcome these difficulties by utilizing a second mold part which closes the first mold part and which results in the formation of a limited internal discontinuity in the foamed product. Accordingly, when the second mold part is removed from the first mold part for stripping of the foamed article from the first mold part through the limited opening therein, portions of the foamed article may be urged into the limited internal discontinuity in the foamed article to partially "collapse" the foamed article and permit the same to be withdrawn through the relatively small opening in the first mold part. As a result, the joint between the mold parts can be positioned on a normally hidden portion of the final article, such as the top coupling flange or ring at the upper extremity of the neck of a doll body—i.e., on the ring or flange which fits within a separate doll head.

Surprisingly, the internal discontinuity that need be formed utilizing the techniques of the instant invention is relatively small compared to the overall dimensions of the article produced. Thus, even though there is a limited internal discontinuity, the final product may still be considered as substantially continuous or "solid," and has the feel and nature of a continuous foamed article, in contrast to the feel and nature of a hollow body.

In order to facilitate stripping of the foamed article through the limited opening in the first or major mold part a fluid under pressure, such as pressurized air, is preferably introduced between the article-forming surfaces of the portion of the mold cavity defined by the major mold part and the exterior of the foamed article to urge portions of the foamed article into the limited internal discontinuity and to "blow" the foamed article out of the major mold part through the relatively small opening at the neck. Thus, the final article produced by the techniques and with the means of this invention may be for all intents and purposes substantially identical to the article produced in accordance with the teachings of the aforementioned Rosen patents with the exception that the final exposed portions of the exterior of the same is seamless. That is, for example, a doll body can be formed according to the instant invention so that the seam thereon is normally hidden from view, and the article has a neck, a torso, and arms and legs completely free of seams.

Thus, it is an object of this invention to provide for the production of effectively seamless foamed articles which are integral and at least substantially continuous in nature in any cross-section between exposed surface portions thereof. Such articles are solid, although light in weight, strong, although resilient to the touch, utilize in a relatively small volume of plastic composition, and have a normally exposed surface which, in addition to being seamless, is quite natural in appearance, having a good feel and a high definition of detail.

The term "continuous" or "at least substantially continuous" as used in the instant specification and in the appended claims with reference to the integral nature of the foamed article of the invention is defined in terms consistent with those utilized in Rosen Pat. No. 3,432,581. Thus, the final product of this invention (1) may have embedded elements such as wire skeletons or the like incorporated therein during the manufacturing operation; (2) may have limited internal discontinuities in the foamed structure, such as the elongated cavity resulting from the elongated shaft utilized in the basic techniques hereof to be described in greater detail hereinafter, as well as other perforations or bores such as would result from special molding techniques such as the special techniques described hereinafter for formation of thin channels during molding which are provided for insertion of wire skeletons after removal of the foamed article from the mold, and such as the special techniques utilized for the formation of foamed articles to be subsequently attached to unfoamed appendages as described in copending application Ser. No. 598,084, filed Nov. 30, 1966, in the names of Jacob J. Rosen and George Winn and entitled "Article Having Rotatable Connection Between Foamed and Unfoamed Parts," now abandoned, the subject matter of which is incorporated herein in its entirety by reference; (3) may have surface depressions or sockets formed during the manufacturing operation as with the appendage sockets mentioned in Rosen and Winn application Ser. No. 598,084, or as with movable eye sockets, such as disclosed in Rosen Pat. No. 3,432,581; or (4) may have a "skin" covering a portion or substantially the entire final product, as will be explained in further detail hereinafter. However, these terms are intended to exclude (a) a basically hollow article, such as the conventional non-foamed vinyl plastisol or other rotationally cast hollow plastic dolls; and (b) an article having a filling which is not integral with the overlying skin or shell, such as, for example, a hollow vinyl doll stuffed with cotton.

Foamable plastic compositions have been known for a number of years and such compositions have been used to make a variety of products. The products of the instant invention may be formed from various plastic compositions, although it has been found that a foamable polyvinyl chloride plastisol is particularly advantageous both from the processing standpoint and from the standpoint of the characteristics of the final product. Such vinyl plastisols are quite strong, whereby relatively small appendages such as fingers and toes on a doll body may be produced. Further, they have a stable color which does not change when exposed to ambient conditions, and they are capable of providing a good feel with exceptionally fine detail. If a slush molded "skin" is to be utilized according to certain embodiments of the instant inventive concept as explained in more detail hereinafter, the skin can also be formed of any number of plastic compositions, but again, is preferably formed of a vinyl plastisol, either a non-foamable vinyl plastisol of the type conventionally used in the formation of rotationally cast hollow dolls or a foamable vinyl plastisol of the type utilized in the formation of the interior of the products of this invention.

Yet a further object of the instant invention is the provision of methods for the formation of products of the type described which require relatively little expense in time and materials as well as relatively inexpensive equipment whereby the products hereof can be economically produced on a large-scale commercial basis. The savings involved in avoiding the necessity of trimming flash from the final product alone are sufficient to render the techniques of the instant invention highly desirable from the standpoint of economics.

In preceding paragraphs of this discussion, particular attention has been directed to the objects of the present invention with respect to the production of a foamed article and in particular a doll body which is seamless and which is adapted to receive a separate head thereon. More particularly, such discussion has been directed to the provision of a doll body including a torso, arms, legs, a neck, and a head coupling flange formed on the end of the neck, wherein the seam formed by the mold parts is on the coupling flange. Thus, when the doll body so formed is joined to a head and the head flange is accordingly disposed within the head, the entire unit is free of undesirable seams. The invention, however, is not limited to the production of a doll body which includes both arms and legs. To the contrary, consistent with a modified embodiment of the invention, the same general techniques as discussed above are utilized to form a body portion, such as the portion of a doll body including a torso, legs, a neck and a neck coupling flange, but not integrally formed arms. Consistent with this modified embodiment, such portion of a doll body is initially formed, and separate arms are joined thereto. Such arms can take various forms. For example, they can be foamed articles made consistent with the techniques of this invention and with or without an unfoamed surface skin and/or they can be hollow and formed according to conventional rotational casting techniques.

It is to be understood, therefore, that it is an object of the invention to provide techniques for the productions of a unique doll body portion, which unique doll body portion has a torso, legs, a neck and a neck coupling flange free of seams, which unique doll body portion has a limited internal discontinuity therein, and which unique doll body portion is adapted to have separate limbs, such as arms joined thereto. Even further, it is an object of the invention to provide particular means secured to the separate arms and cooperating with the unique doll body portion to secure the separate arms to the unique doll body portion in such manner that the arms will not detach from the body portion during normal use and/or even under undue stress.

An even further object of the present invention is to provide for the production of a doll body conforming with any one or all of the preceding objects and having either integrally formed or separately formed arms wherein means in the form of a sleeve is provided within the internal discontinuity formed in the body, which sleeve has an external contour conforming to the contour of the discontinuity, and which sleeve provides resilient support against undue or undesirable compressability of the body portion in areas disposed in surrounding relation to the internal discontinuity.

Again, for emphasis, it is reiterated that although the majority of the discussion herein is directed to the production of doll bodies from vinyl plastisols, and although this invention is paritcularly important in the production of such products, the methods hereof are also applicable to the production of other foamed articles utilizing other plastic compositions.

Other and further objects of the instant invention will be readily recognized or will be specifically pointed out in the following detailed description of the instant invention which makes reference to the accompanying drawings, wherein.

Like reference characters refer to like parts throughout the several views of the drawing.

Figure 1A:
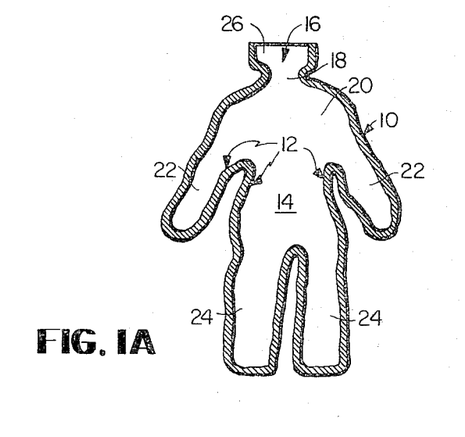
FIGS. 1A through 1F schematically illustrate various steps of a preferred technique and mold construction utilized according to the instant invention for the production of an effectively seamless, foamed doll body which includes an enveloping, slush molded, skin.

Referring now to the drawing in general, and more particularly, to FIGS. 1A through 1F, a preferred embodiment of the instant inventive concept is schematically illustrated by showing certain of the steps involved in a molding technique for the production of a continuous foamed article having a slush molded skin. FIG. 1A illustrates a major mold part 10 having seamless internal article-forming surfaces 12 defining a cavity 14 with a limited opening 16 for a purpose to be described in more detail hereinafter. The article forming surfaces 12 define almost all external surfaces of the final product. Thus, the mold part 10 shown in vertical cross-section in FIG. 1A has a cavity 14 in the shape of a doll body, although as indicated previously, the instant inventive concepts can be utilized for the production of other articles. However, for the formation of doll bodies, a preferred configuration of the cavity 14 includes a portion 18 for the formation of the neck, a portion 20 for the formation of the torso, portions 22 for the formation of the arms, portions 24 for the formation of the legs and a portion 26 for the formation of an outwardly extending flange at the extremity of the neck, the flange serving to secure a head (not shown) thereover in a well-known manner. For convenience, the same reference numerals are used herein to identify the portions of the cavity 14 and the portions of the foamed article defined thereby.

In order to facilitate removal of the finished foamed article from the mold part 10, the legs 24 are preferably arranged as extensions of the torso 20 lying in the same general vertical plane as the neck 18 and extending generally parallel to and on opposite sides of, an axis passing centrally through the neck 18 and the arms 22 are arranged as extensions of the torso 20 positioned on opposite sides of the aforementioned axis in the same general vertical plane as the neck 18 and converging towards the the axis at the neck.

Although utilizing the basic techniques of Rosen Pat. No. 3,432,581 referred to hereinabove, a product can be formed entirely from a foamed plastic composition such as foamed vinyl plastisol, such product having a fine, smooth surface, due to the particular stripping technique of the instant invention wherein the foamed article is subjected to some increased stress during removal from the mold, it is preferred to initially slush mold a skin on the article-forming surfaces 12. This step, in addition to protecting the final article against damage during the stripping operation, also assists in producing an article having excellent definition of detail, particularly in areas such as the hands and feet which include relatively fine design characteristics. If desired, these portions alone may be initially treated with, for example, a high-grade vinyl plastisol as disclosed in detail in Pat No. 3,456,046. Alternatively, and preferably for most applications, a layer of a skin-forming plastic composition may be applied to all of the article-forming surfaces 12. This skin-forming plastic composition ca nbe any one of many known resinous materials, but for optimum results, is a polyvinyl chloride plastisol. Moreover, the skin-forming plastic composition can be either a foamable composition or a non-foamable composition, but again, for most applications, a non-foamable plastic composition is preferred. When utilizing a foamable vinyl plastisol for the interior of the doll body, a high-grade non-foamable vinyl plastisol is generally selected for the skin-forming plastic material. Selection of a plastic composition for formation of the skin and/or the interior of the foamed article is well within the skill of the art. Both non-foamable and foamable vinyl plastisols are quite well known as are other materials that may be substituted therefor.

The skin can be slush molded on the article-forming surfaces 12 in any desired manner. For example, a limited quantity of skin-forming plastic composition can be introduced into the cavity 14 through the opening 16, with the mold part 10 then being moved to distribute the same over the article-forming surfaces 12 while heating the mold part to solidify a layer of skin-forming plastic composition thereon. Alternatively, and preferably, the cavity 14 can be completely filled with a skin-forming plastic composition such as shown at 28 in FIG. 1B to adhere a layer of the same on the article-forming surfaces 12, following which the cavity 14 may be emptied of non-adhered skin-forming plastic composition by inverting the mold part 10 as shown in FIG. 1C.

Figure 1B:
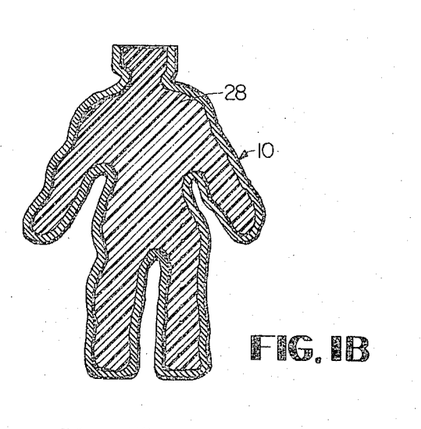

The mold part 10 may be cold when the skin-forming plastic composition 28 is introduced and a thin layer of skin-forming plastic composition will adhere to the article-forming surfaces 12. Subsequently, the mold part can be heated to solidify the skin 30 as desired. When using a conventional high-grade vinyl plastisol to form a doll body approximately 15 inches in overall height with a spread of approximately 12 inches between the extremities of the hands and a transverse dimension of approximately 5 inches at the hips, heating of the mold for approximately 2 minutes at 400° F. causes gelling of the skin 20 to solidify the same.

It will be understood that the dimensions, quantities of materials, and processing times and temperatures set forth herein are only illustrative since the instant inventive concepts can be utilized for forming articles of various sizes and shapes with the quantities of materials and processing conditions being readily determined by those skilled in the art for the particular article being formed.

Figures 1C, 1D, 1E, 1F:
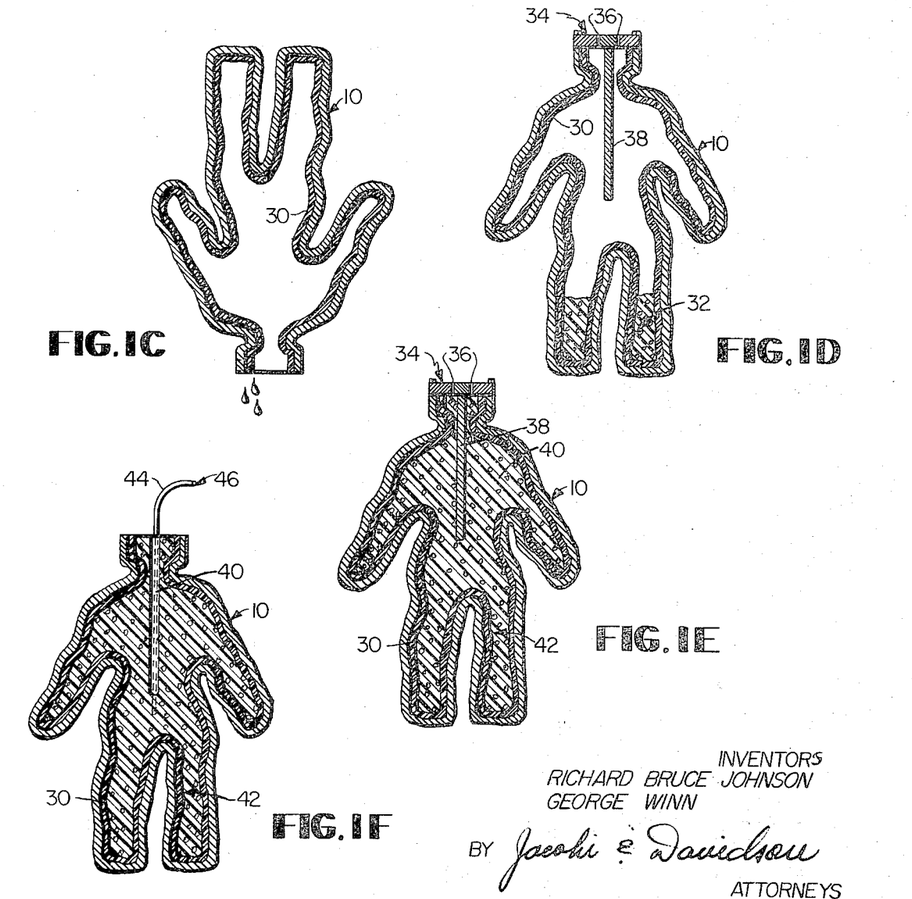

Although use of an initially cold major mold part is convenient in most instances, if desired, such mold part may be preheated prior to introduction of the skin-forming plastic composition 28 whereby the skin 30 will gel on the article-forming surfaces 12 prior to emptying the mold part of nonadhered plastic composition in the manner of FIG. 1C.

As indicated previously, a foamable plastic composition such as a foamable vinyl plastisol can be utilized for the formation of the slush molded skin in a similar manner to that shown in FIGS. 1B and 1C. This foamable vinyl plastisol can be of the same composition as the material 32 to be utilized for the formation of the interior of the foamed article as described in detail hereinafter.

As mentioned previously, while not critical, the formation of a slush molded skin provides certain advantages when utilizing the techniques of this invention. In any event, the skin thus formed may be substantially thinner than that which would be necessary utilizing prior art techniques for the formation of foamed articles with an enveloping skin.

As shown in FIG. 1D, the preferred technique for formation of the interior of the foamed article is to introduce a limited quantity of the foamable plastic composition 32 into the interior of the skin 30 through the opening 16 followed by closing of the mold with a second mold part 34 which seals the opening 16. The second mold part 34 preferably includes relatively small passageway means 37 communicating the cavity 14 with the exterior of the mold for "venting" of the cavity during curing and foaming as in the aforementioned Rosen techniques. These passageway means may be defined in the major mold part 10, rather than in the second mold part 34, but location of the same in the second or closure mold part precludes the formation of any marks on ultimately exposed portions of the final product.

The second mold part 34 further includes an elongated shaft 38 which extends centrally through the neck 18 of the first mold part into the torso portion 20 thereof in spaced relationship to the article-forming surfaces 12 for a purpose to be described in more detail hereinafter. The second mold part 34 may be secured to the first mold part 10 in any conventional manner such as by bolts or the like (not shown).

After the foamable plastic composition is put in the first mold part and the second mold part is joined thereto to close the mold, the quantity of foamable plastic composition 32 is initially distributed on the interior of the skin 30 by subjecting the mold to movement, preferably as in conventional rotational casting wheerin the mold is moved simultaneously orbitally about a first axis while being rotated about a second axis disposed at an angle, generally a right angle, to the first axis. During this movement, the mold is heated to gell a layer of the foamable plastic composition on the interior of the skin 30, and prefereably also on the article forming surfaces defined by the interior surfaces of the second mold part including the surfaces of shaft portion 38 of the second mold part. Wtih a foamable vinyl plastisol for the formation of a doll body of the dimensions given previously, a quantity of about 350 grams of material is introduced into the cavity and rotated for about 2½ minutes at 400° F. to provide satisfactory distribution and gelling.

If desired, the mold may be initially submerged in a hot water tank for about 40 seconds prior to the rotational casting to improve the uniformity of the temperature of the mold during the gelling operation.

Following formation of the gelled layer of plastic composition on the interior of the skin 30, the mold part is heated to cure and foam the gelled plastic composition so as to substantially completely fill with foam the article forming cavity defined by mold cavity 14 and shaft 38. This results in forming a limited internal discontinuity 40 having the configuration of the shaft 38 as seen in FIG. 1E.

Although the above-described further heating for the purpose of curing and foaming may take place in a rotational casting oven with the article forming cavity being "vented" through the passageway means 36 to the heated air atmosphere surrounding the mold, the curing and foaming operation is preferably accomplished by submerging the mold into a bath of a liquid heating medium (not shown) heated to a temperature sufficient to cause curing and foaming of the gelled layer. Suitable liquid heating media for this purpose and the advantages of the liquid heating step are disclosed in Rosen Pat. No. 3,432,581.

It is important that the article forming cavity be "vented" to an environment under less pressure than that existing within such cavity during the curing and foaming operation in order to preclude malformation of the foamed article. When using a rotational casting oven for curing and foaming, the heated air defines this environment of less pressure than that existent within the article forming cavity. With the use of a liquid heating medium, the passageway means 36 are exposed to the liquid heating medium which forms the environment under less pressure than that existent within the cavity.

Curing and foaming for approximately 5¾ minutes in a liquid heating medium heated to a temperature of approximately 348° F. provides proper processing for formation of a continuous foamed article of the dimensions mentioned hereinabove.

When the curing and foaming operation is completed, small strands of foamed material will extrude through the passageway means 36 thereby providing an indicator for removal of the mold from the heating medium. This is a relatively simple manner of precluding rejects caused by "underblowing" or "overblowing" of the foamable plastic composition. The curing and foaming operation may be stopped by submerging the mold in a quenching bath, approximately 8 minutes being sufficient for quenching a mold of the size described previously.

When the article has been finally formed, the second mold part 34 is removed, and the foamed article 42 is then "stripped" or removed from the first or major mold part 10 by urging portions of the same into the limited internal discontinuity 40 formed by the shaft portion 38 of the second mold part. This is preferably accomplished by introduction of a fluid under pressure, such as pressurized air, between the article-forming surfaces 12 and the foamed article 42 while withdrawing the foamed article through the opening 16. For this purpose, a tube or conduit 44 can be slid between the article-forming surfaces 12 and the foamed article or doll 42, preferably along the back thereof, in the manner shown particularly in FIG. 1F and in greater detail in FIGS. 2 and 3. Note that with the embodiment shown, the operator initially pushes flange 26 of the doll body away from the adjacent mold wall so the tube 44 can be inserted into the first mold part. After tube 44 has been inserted, it is moved downwardly into the cavity defined by the first mold part 10, with pressurized air being introduced therethrough. Simultaneously, the operator then pulls upwardly on the flange 26 thus urging the doll outwardly from the mold. This is continued so that the conduit 44 moves further downwardly to the area of the crotch of the doll, and so that the doll is moved upwardly in the mold cavity. As the doll moves upwardly, the larger areas thereof (i.e., the shoulders) tend to seal the neck opening of the cavity and the pressure within the mold cavity builds up. With the increase in pressure and the continued pulling, the doll eventually pops from the cavity in the first mold part.

If desired, following quenching, the mold may be placed into a hot water tank for approximately 1 minute, a procedure which is found to further facilitate the stripping operation.

It is extremely surprising that the foamed article 42 may be removed through the limited opening 16 in the manner just described. Without the limited internal discontinuity 40, it is impossible to remove a substantially solid article of the general shape shown through such a relatively small area such as the neck portion 18 without great damage to the article. However, with the techniques described herein, a substantially solid doll body may be removed through a neck portion of a mold which measures only approximately 2 inches in diameter, even though the doll body has a maximum transverse dimension of approximately 5 inches at about the crotch level with the extremities of the arms being separated by as much as approximately 12 inches. This stripping operation may be accomplished even though the limited internal discontinuity has a dimension of only approximately 1¼ inches in diameter and extends only about 8 inches from the top of the doll body into the torso in a doll measuring approximately 9 inches down to the crotch and approximately 15 inches in overall height. Thus, a relatively small internal discontinuity 40 is adequate to permit stripping of a relatively large foamed article through a limited area such as the neck portion of the major mold part in the embodiment described herein.

Even more surprisingly, the final product resulting from the techniques of the instant invention is of a nature quite comparable to a product which does not have a limited internal discontinuity such as the discontinuity 40. That is to say, the products of this invention feel substantially as solid and firm as products formed without such a limited internal discontinuity. This may be due to the formation of a somewhat denser portion of foam surrounding the forming surfaces of shaft 38 in a manner similar to the formation of the integral skin or denser portion on the exterior of foamed articles produced as described in aforementioned Rosen Pat. No. 3,432,581.

Figures 2, 3, 4, 5, 6:
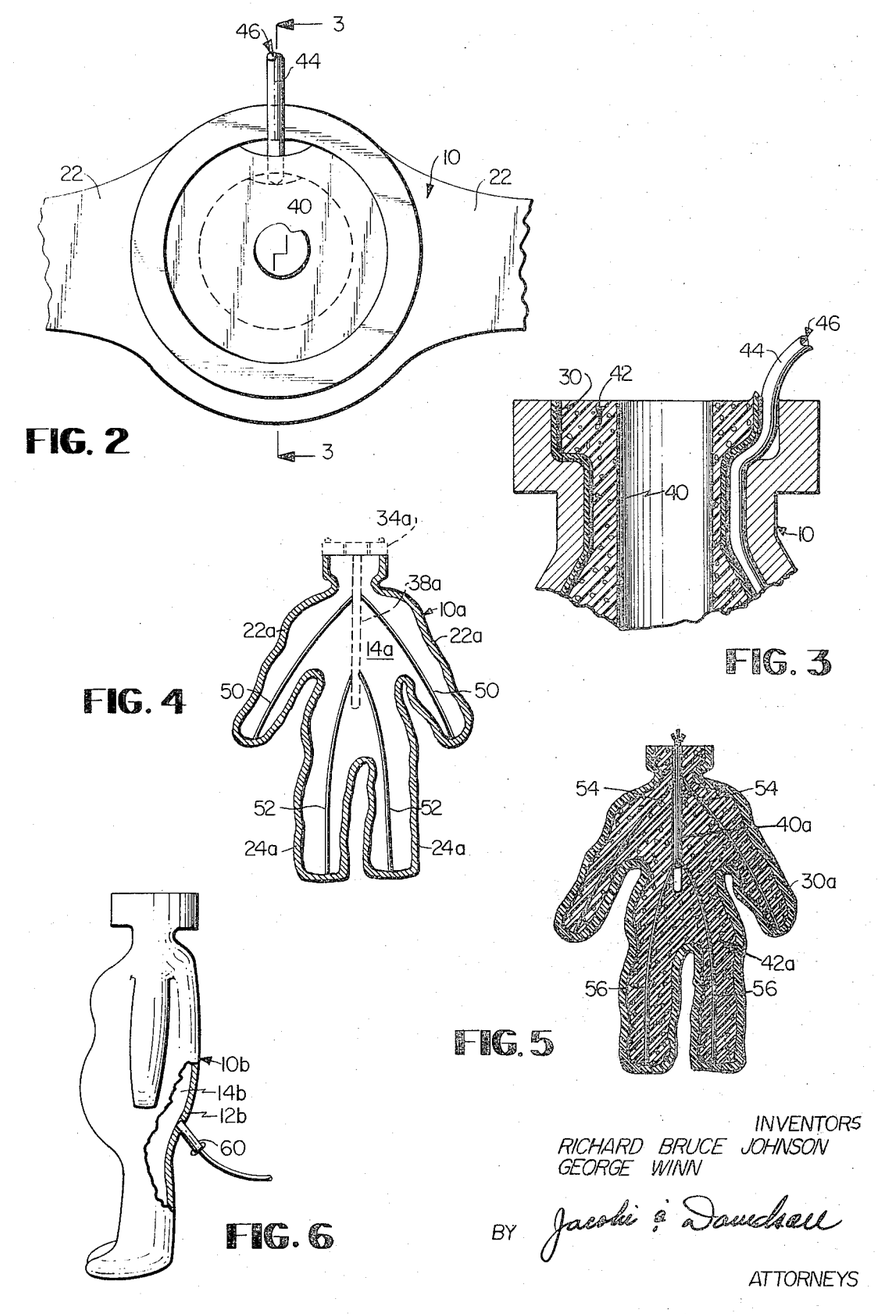
FIG. 2 is a fragmentary enlarged plan view showing in detail the introduction of a fluid under pressure to facilitate the stripping operation.
FIG. 3 is a fragmentary cross-sectional view taken substantially on lines 3—3 of FIG. 2.
FIG. 4 is a vertical cross-sectional view of a modified mold according to this invention utilized for forming a doll body adapted to receive a wire skeleton after removal from the mold.
FIG. 5 is a vertical cross-sectional view of a doll body formed in the modified mold of FIG. 4 and having a wire skeleton incorporated therein.
FIG. 6 is a side elevational view of a modified mold arrangement which may be used to facilitate stripping.

Although the stripping of the foamed article from the first or major mold part can be accomplished in the manner described above with the use of tube 44 alone, it appears that it may be possible to further facilitate stripping by utilizing an arrangement such as shown in FIG. 6. If reference is made to this figure, it will be noted that the major mold part 10b, shown in side elevation, has an internal cavity with article forming surfaces 12b, such surfaces are the same as the article forming surfaces 12 described above. However, a valve device 60 is secured to mold part 10b. The valve device 60 provides a path for fluid communication with the cavity 14b of mold part 10b in the area of the crotch, as shown. The valve device can include, for example, a plunger, not shown, which normally has an end portion that forms a small part of the article forming surfaces 12b when the valve is closed. Thus, the foamed article can be molded in the same manner as previously described with or without a skin.

Yet, with the embodiment of FIG. 6, air or other suitable fluid can be fed directly to the mold cavity through valve device 60. When the molding operation is completed, the supply of air through this valve device can be used alone or in combination with tube 44 to facilitate stripping.

The portion of the article or doll immediately adjacent the end portion of the valve device, i.e., the valve inlet into the article forming cavity, may have some small scar or flash, resulting from the use of the valve device. But still, both the article forming surfaces and the foamed article are effectively seamless.

Referring now particularly to FIGS. 4 and 5, a preferred technique for forming a foamed product having a wire skeleton incorporated therein utilizes a modified major mold part 10a which includes relatively thin wire elements 50 and 52 secured at one end to the mold part 10a at the extremities of the arm and leg portions 22, 24, respectively, the opposite end portions of the wide elements 50, 52 extending to the portion of the caviety 14a which receives the shaft 38a of the second mold part 34a shown in dotted lines in FIG. 4.

During the molding operation, the final product 42a shown in FIG. 5 is thereby provided with the small diameter elongated channels through the arms and legs, each of which extend to the limited internal discontinuity 40a formed by the surfaces of shaft 38a. Following removal of the foamed product 42a, which may include a skin 30a if desired, from the major mold part in the manner described with respect to the previous embodiment, thin wire members 54 and 56 may be inserted into the channels formed by the wire elements 50, 52, respectively, through tiny holes formed by the wire elements at the extremities of the arms and legs. The wire members 54, 56 may extend into or above the limited internal discontinuity 40a and be secured together in any desired manner such as, for example, by twisting to provide the final product 42a with an internal bendable skeleton.

The technique of FIGS. 4 and 5 precludes the necessity for removing a foamed article having wire elements already embedded therein through the limited opening in the body portion of the mold. Yet, the final product can be provided in this manner with a bendable wire skeleton so that the appendages thereof may be positioned in any desired relationship with respect to the torso.

The tiny openings formed in the exterior of the foamed article will be unnoticeable after the wire members have been inserted since the resilient nature of the plastic composition tends to seal the openings and covers the ends of the wire members.

Thus, it will now be seen that by utilizing the above-described methods and means of this invention, it is possible to form a foamed article such as a doll body having a substantially continuous cellular interior, with or without an overlying layer of a skin-forming plastic composition, and with or without an internal skeleton, which foamed article is effectively seamless, that is, is free from "flash" and seams over its entire surface.

Although doll bodies formed according to the embodiments of the present invention discussed in connection with FIGS. 1 through 6 have a multitude of advantages, as explained, it is to be understood that the invention is not limited in any way to the provision of a doll body wherein the limbs, such as the arms, are necessarily integrally formed with the remaining parts of the body. In this regard, particular attention is now directed to the modified embodiment of the invention shown in FIGS. 7 and 8.

Figures 7, 8:
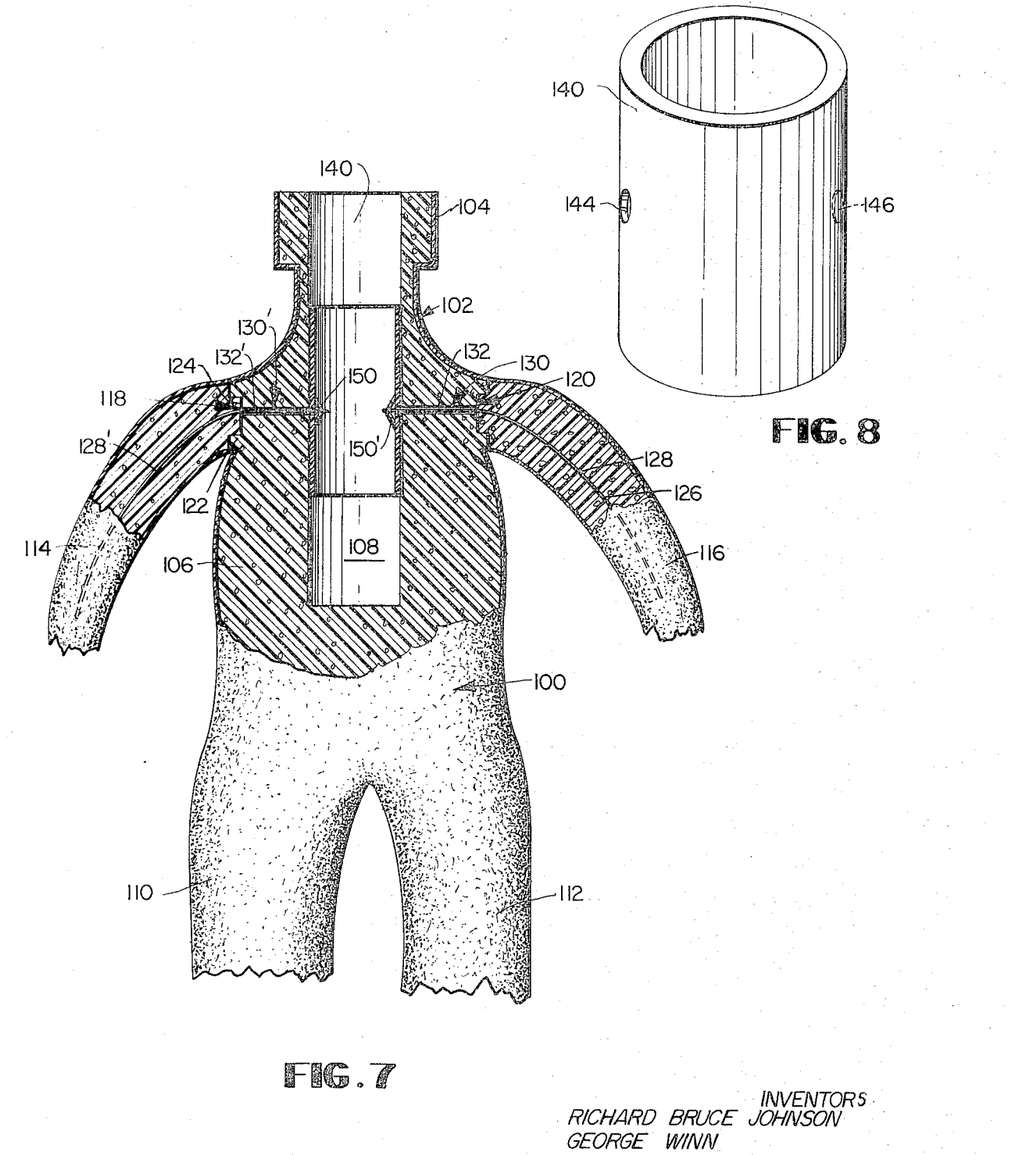
FIG. 7 is a front view partially in section, of a doll body formed in accordance with a modified embodiment of the present invention, according to which modified embodiment, sleeve means is utilized to reinforce the walls of the limited internal discontinuity, and according to which modified embodiment, separate arms can be formed and security joined to the torso.
FIG. 8 is an enlarged perspective view of the sleeve used in the embodiment of FIG. 7.

By referring to FIG. 7, it will be noted that the doll body 100 shown therein includes a neck portion 102 having a coupling flange 104 at the upper end thereof, a torso portion 106 with a limited internal discontinuity 108 therein, and a pair of legs 110 and 112 extending from the lower part of the torso portion 106. Coupled to the doll body 100 are a pair of separately formed arms 114 and 116.

The doll body 100 is molded according to any one of the various techniques discussed in connection with FIGS. 1 through 6, that is, such doll body can be formed with or without a skin such as the skin 130, and it can be formed in molds which conform substantially identically to those previously discussed with the exception of the fact that such molds would not have arm cavities therein for formation of the doll body 100 of FIG. 7. Yet, for example, channels can be formed in the legs 110 and 112 if a mold having wire channel forming elements such as taught in connection with FIGS. 4 and 5 is utilized.

In any event, the body 100 preferably is formed with socket areas or portions 118 and 120 which are adapted to receive the separate arms 114 and 116. The socket portions 118 and 120, as shown, include outer rings or flanges 122 which surround a recessed surface 124. However, any socket type connection can be utilized without departing from the scope and spirit of the invention. The important factor is to understand, with respect to the embodiment of FIG. 7, that the respective arms and co-operating portions of the torso are preferably so formed as to provide for a proper fit and alignment between the arms and the torso.

The arms 114 and 116 are shown in FIG. 7 as being formed of a foamed plastic composition with an unfoamed skin, although they can be formed with or without such unfoamed skin. In this regard, molds having an interior cavity conforming with the shape and contour of the arms can be provided, and the arms formed in the same manner as the foamed articles or dolls discussed previously. In fact, the arms are preferably formed in an arm mold having channel forming wires or rods therein such as the channel forming rods or wires discussed in connection with FIGS. 4 and 5. This results in the formation of an arm having a limited channel or bore therein such as the channel or bore 126 shown in FIG. 7.

Notwithstanding the fact that the arms shown in FIG. 7 are solid foamed arms, it should be appreciated that the separate arms utilized with the modification shown in FIG. 7 can be of any suitable form. For example, if desired, the arms can be formed of unfoamed plastisol and as hollow arms according to prior art rotational casting techniques. With the preferred embodiment shown in FIG. 7, however, the arms are solid foamed arms and have channels 126 formed therein during the molding thereof. Thus, when the arms 114, 116 are removed from the mold, they are joined to a coated wire 128 which is longer than the channel 126 in the arm. The wire 128 preferably comprises a central core metal wire having a plastic coating thereover. An adhesive or cement compatible with the plastic coating and also compatible with the foamed material defining the channel 126 is applied to the coating on the wire, and the coated wire is inserted into the channel 126 so as to join the same to the arm itself. The resultant arm then comprises the foamed body portion with a coated wire projecting from the upper end thereof. This wire, as explained more fully below, is utilized for purposes of joining the arm to the torso.

Referring again to FIG. 7, it will be noted that the wire 128 for the arm 166 ultimately is to extend through the torso portion between the socket area 120 and the limited internal discontinuity. For this purpose, a channel 130 is pierced through the torso 100 after the formation of the torso. Having pierced the channel 130, a tube 132 is preferably inserted therein, which tube is formed of some comparatively wear resistant composition such as, for example polyethylene, polystyrene, or polypropylene. The tube 132 need not be used and instead the coated wire can pass through the pierced opening without the protection afforded by the tube. The particular material from which the tube 132 is formed is not critical, and instead, it is sufficient to understand that this tube is incorporated for purposes of protecting the portions of the torso adjacent the wire 128 from undue pressures, and resulting tearing, for instance.

The tube 130 extends from the socket area 120 and perpendicular to the recessed face 124 thereof to the limited internal discontinuity. It is to be noted that even though the immediately preceding discussion has been directed to the details of construction as applicable to the arm 116, the same details are applicable to the arm 114, and accordingly, it appears unnecessary to repeat the discussion with respect to the arm 114. Suffice it to say, that the wire 128' extending from the arm 114 passes through a tube 132' disposed in a pierced channel 130' so that the tube 132' and wire 128' extend from the socket area to the limited internal discontinuity 108. The wires 128 and 128', however, project into the limited internal discontinuity 108 whereas the tubes 132 and 132' have inner ends which terminate at the surface of the limited internal discontinuity.

Within the limited internal discontinuity, there is disposed a sleeve means in the form of a tube 140. This tube 140, shown separately in FIG. 8, has an outer contour which conforms to the surrounding contour of the limited internal discontinuity so that the tube 140 is essentially in frictional engagement with the surrounding walls of the limited internal discontinuity. The tube 140 has diametrically opposed apertures 144 and 146 therein, and preferably the tube 140 is inserted in the limited internal discontinuity 108 prior to the time the arms 114 and 116 are going to be joined to the body 100. The apertures 144 and 146 are aligned with the inner ends of the tubes 132 and 132' so that the wires 128 and 128' extending from the arms can be passed through the tubes 132 and 132' and in turn through the apertures 144 and 146 so that the ends of such wires project into the interior of the tube 140.

With the ends of the wires 128 and 128' projecting inside of the tube 140, such ends can be fixed in cooperating relation to the tube 140. For this purpose, so-called speed nuts 150 and 150' are slipped over the inner ends of the respective wires 128 and 128', thereby providing the ends of such wires with a head portion which is in abutting relation to the interior of the tube 140. The arms are thus secured in desired position. For preferred results, a washer is slipped over the end of each wire before the speed nut is placed thereon. The use of a washer tends to increase the effectiveness of the speed nut.

It will now be appreciated that with the embodiment of FIG. 7, a foamed body portion is provided without integrally formed arms, but arms can be readily attached thereto by the unique securing means discussed. The ability to form the body and yet satisfactorily attach separate arms has several advantages. First, it permits the manufacturer, if he desires, to incorporate arms of various types to meet differing market needs. Secondly, and of equal if not greater importance, is the fact that a doll body without arms, such as the doll body 100, can be somewhat more easily stripped from a mold than a doll body provided with integrally formed arms. Thus, even though the arrangement of FIG. 7 requires extra steps in joining separate arms to the main doll body, it will be appreciated that the removal of a doll body without arms from a mold can be substantially easier than the removal of a doll body with arms. In either event, however, during the formation, a limited internal discontinuity is utilized which limited internal discontinuity provides an area for collapse of the body during stripping, which area does not interfere with the ultimate strength and feel characteristics of the article.

In this latter regard, it might be noted that with any one of the embodiments discussed, and not just with the embodiment of FIG. 7, a separate sleeve means or tube, such as the tube 140, can be provided within the limited internal discontinuity. This sleeve means or tube can have various lengths depending on the desired characteristics so that it can extend over part of the limited internal discontinuity or over the full length thereof. With the use of a sleeve means or tube as described, additional reinforcement is provided in abutting relationship to the walls of the limited internal discontinuity so that the strength of the ultimate article is reinforced and/or can be controlled. As a result, the size of the limited internal discontinuity can be varied to meet varying stripping conditions depending on the shape and size of the final article, all without significantly interfering with the external feel characteristics and/or without interfering with the relative compressability or resiliency of the body. In other words, a sleeve means such as the tube 140 can be incorporated for purposes of cooperating with means to secure separate arms in place and/or it can be utilized with a body having integrally formed arms. In the former event, it provides support adjacent the walls of the limited internal discontinuity as well as means for fastening the arms in place, whereas, in the latter instance, it provides only the support characteristics.

Before concluding, it should be noted again that even though the invention has been discussed in particular connection with dolls, it is not limited to the formation of dolls and instead, is applicable to a multitude of different types of foamed articles. Additionally, it should be noted that the drawings presented herewith are not made to scale, but instead, are exemplary in nature. Thus, for presentation purposes, the skin 30 shown in the embodiments of FIGS. 1–3 appears relatively thick, whereas, in fact, such skin can be very thin and as noted above, substantially thinner than the material which would be utilized in the walls of a hollow rotationally cast shaped article.

Having now described the present invention in considerable detail, it will be apparent that the objects set forth at the outset of the present specification have been successfuly achieved.

Accordingly, what is claimed is:

1. In a method of forming a substantially continuous foamed plastisol article in a mold cavity, the major portions of the mold cavity being defined by a main mold part having substantially seamless internal article-forming surfaces and portions forming a limited opening through which the foamed article must be stripped, the opening having a cross-sectional area transverse to the direction of stripping therethrough which is smaller than the cross-sectional area of foamed material in a portion of the foamed article which must pass through the opening during the stripping operation, the improvement which comprises forming a limited internal discontinuity in the foamed article before stripping the foamed article through the opening, introducing a fluid under pressure between the article-forming surfaces and the exterior of the foamed article, and with the assistance of the fluid pressure urging portions of the foamed article into the limited internal discontinuity while stripping the foamed article through the opening, the extent of said internal discontinuity being sufficiently large to permit the stripping of the foamed article through the opening without damaging the foamed article, while sufficiently limited to provide the foamed article with substantially the feel and firmness of a solid foamed article in contrast with the feel and firmness of a hollow unfoamed article.

2. The method of claim 1 wherein said limited internal discontinuity is elongated and has an axis generally aligned with the direction of stripping of the foamed article through the opening in the main mold part, said limited internal discontinuity being formed so as to extend from the interior of the foamed article to the surface of the foamed article in spaced relationship to the portions of the main mold part forming the opening.

3. The method of claim 2 wherein a quantity of unfoamed, but foamable, plastisol composition less by volume than the volume of the mold cavity is introduced into said cavity through said opening, closing said main mold part with a further mold part including means adapted to define said limited internal discontinuity, gelling a layer of said unfoamed plastisol composition conforming to the configuration of the article-forming surfaces of the main mold part, curing and foaming said gelled plastisol layer to substantially fill the closed cavity with foam while forming said limited internal discontinuity in the resultant foamed article, removing the further mold part from the main mold part, and then stripping the foamed article through the opening with the assistance of the fluid under pressure.

4. The method of claim 3 wherein the mold cavity is communicated with an environment under less pressure than that existent with the cavity through relatively small passageway means during the foaming of the gelled plastisol layer.

5. The method of claim 4 wherein, prior to introduction of said quantity of unfoamed, but foamable, plastisol composition into said cavity, a layer of a skin-forming plastisol composition is applied to the article-forming surfaces of the main mold part and solidified thereon, and then said quantity of unfoamed, but foamable, plastisol composition is introduced into the interior of the thus-formed skin.

6. The method of claim 4 wherein at least a major portion of the curing and foaming of said gelled plastisol layer is carried out by submerging the closed mold in a liquid heating medium heated to a temperature sufficient to cause the curing and foaming of the gelled layer.

7. The method of claim 3 wherein said foamed article includes a portion of a doll having a neck, a torso and arms and legs, said article-forming surfaces defining said neck, torso and arms and legs and further defining an outwardly extending flange at the extremity of said neck, said further mold part cooperating with said flange.

8. The method of claim 7 wherein said limited internal discontinuity is defined centrally of said flange and said neck and extending into said torso.

9. The method of claim 8 wherein said limited internal discontinuity is formed by an elongated shaft forming part of said further mold portion and extending through the part of said cavity defining said flange and said neck into the portions of said cavity defining said torso, said shaft being maintained in spaced relationship to said article-forming surfaces.

10. The method of claim 7 wherein said fluid under pressure is introduced by sliding a conduit for said fluid between said article-forming surfaces and said foamed article, said flange sealing said foamed article against the portions of said article-forming surfaces defining said flange to preclude escape of said fluid during the initial portion of the stripping operation.

11. The method of claim 7 further including forming thin elongated channels in said portion of said doll extending from the extremities of said arms and legs to said limited internal discontinuity, and inserting bendable wire members into said channels after stripping said foamed article from said mold.

References Cited

UNITED STATES PATENTS

| | | | |
|---|---|---|---|
| 3,324,209 | 6/1967 | Holt et al. | 264—334 |
| 2,484,397 | 10/1949 | Barton | 264—54 |
| 2,569,869 | 10/1951 | Rempel | 264—310 |
| 2,959,820 | 11/1960 | Miller et al. | 264—310 |
| 3,002,230 | 10/1961 | Stewart | 264—310 |
| 3,161,712 | 12/1964 | Hungerford et al. | 264—310 |
| 3,164,653 | 1/1965 | Inouye | 264—310 |
| 3,364,292 | 1/1968 | Lemelson | 264—310 |
| 3,444,281 | 4/1969 | Cahill et al. | 264—45 |
| 3,505,137 | 4/1970 | Kliene | 264—45 |

HERBERT S. COCKERAM, Primary Examiner

U.S. Cl. X.R.

264—51, 55, 310, 334, 335